United States Patent Office 3,140,269
Patented July 7, 1964

3,140,269
HYDRAULIC CEMENT COMPOSITION CONTAINING A MIXTURE OF POLYMERIC ADDITAMENTS AND METHOD OF CEMENTING A WELL THEREWITH
Winton W. Wahl, Tulsa, Okla., and Charles D. Dever, Saginaw, Mich., assignors to The Dow Chemical Company, Midland, Mich., a corporation of Delaware
No Drawing. Filed May 9, 1960, Ser. No. 27,475
6 Claims. (Cl. 260—29.6)

The invention relates to an improved hydraulic cement composition and method of use thereof for cementing operations, particularly for cementing wells penetrating subterranean formations. The term hydraulic cement as used herein refers to the well-known water-settable anhydrous pulverulent material prepared substantially by crushing an admixture of calcareous and argillaceous material, fusing the crushed mixture, and grinding the resulting fused mass to a fine powder consisting principally of calcium silicates with lesser amounts of calcium aluminates and calcium alumino-ferrites and usually some added calcium sulfate or magnesium sulfate. When such composition is admixed with a suitable amount of water, the well-known pumpable aqueous slurry is formed with what is thought to be colloidal silicates in a water system which subsequently crystallize in the colloidal state to form a monolith composed of interlocking crystals. Aluminous cement and Portland cement illustrate the hydraulic cements above described.

Among the many uses of hydraulic cement is that of cementing wells penetrating a gas- or oil-bearing subterranean formation. The principal purposes of such cementing is to shut off water or brine-bearing horizons, e.g., connate water, from the gas- and/or oil-bearing horizons and to secure the well casing in position.

Although the sand is employed in the preparation of hydraulic cement compositions for a large number of purposes, sand is customarily not employed in cement compositions used in well cementing operations. In such cementing operations, the composition, as prepared, consists basically of a mixture of cement and water known as neat cement.

The use of neat cement for well cementing operations has grown at an accelerated rate from a slow start until it now occupies a position of major importance in oil production. Its use has also been paralleled by increasing technology. It is now known that the setting of an aqueous hydraulic cement slurry is influenced by a number of conditions, among which are: the composition of the cement, e.g., the ratio of tricalcium silicate to dicalcium silicate and the presence of calcium and magnesium ions; the degree of fineness of the grind; the ratio of cement to water; the amount and type of dissolved minerals in the water; the temperature of the slurry during mixing and setting; the pressure to which the slurry is subjected during setting; the extent of contact of the slurry with clay, rust, or other contaminants prior to setting; and the working or moving of the cement slurry or paste after thickening has set in.

The effects of (1) heat and pressure on the setting of cement, (2) additaments on the viscosity, thickening rate, setting time, and the fluid loss to the formation from the slurry, and (3) mechanical disturbance, such as that brought about by pumping the cement into position after thickening has set in, are conditions which are of particular concern in the practice of the invention.

Heat and pressure are of concern in the practice of the invention because cementing jobs are frequently performed in deep wells having bottom hole depths of many thousands of feet where relatively high temperatures and pressures exist. It has been found that heat tends to hasten the rate of thickening and thereby impairs the pumpability of a water and cement slurry and decreases the setting time thereof. It has also been found that increasing pressures on the cement during setting has lessened the setting time of the slurry. The combined effect of increasing both temperature and pressure has been shown to have a pronounced effect upon the thickening and setting of an hydraulic cement slurry.

A number of additaments have been used to effect a retardation in the rate of setting of aqueous hydraulic cement slurries. Among known retardants are quebracho, sodium hexametaphosphate, calcium lignosulfonate, boric acid, gum arabic, casein, dextrin, starch, cellulose derivatives, and bentonite. A number of additaments have also been employed to effect a lessening of the loss of fluid from the aqueous cement slurry to the formation prior to set. Some of the above retardants have been employed in attempts to control both the setting time and the fluid loss, particularly those which also have a thickening effect such as carboxymethylhydroxyethyl cellulose and bentonite. Other materials employed to lessen fluid loss are latices and such mixtures as pregelatinized starch.

Of particular importance among the above stated discoveries concerning aqueous cement slurries is the adverse effect of moving, pumping or otherwise agitating the cement slurry or paste after the latice or matrix of crystal growth has advanced sufficiently to be in evidence, usually manifested by a thickening effect. Movement of the thus thickened cement slurry is now known to have a deleterious effect on the ultimate strength properties of the set cement or even to prevent it from setting to a hard solid at all. Therefore, attempts to lessen fluid loss must be guided by the danger of accelerating the thickening time of the slurry.

Attempts to inhibit the fluid loss to the formation prior to final set of the slurry has not been fully satisfactory. One difficulty has been that fluid loss control additaments have not retarded the thickening time but, on the contrary, has hastened the thickening time. The adverse effect upon thickening of aqueous cement slurries by known fluid loss control additaments has not been easily corrected by admixing therewith known thinning agents. Effective combinations and effective amounts of fluid loss control agents and of retardants are not readily predictable. A need exists for additaments which may advantageously be added together or successively to a cement slurry to attain both (1) thinning and delayed thickening and (2) fluid loss control.

The invention provides an aqueous slurry and method of cementing a well penetrating a substerranean formation employing the slurry which attains the desirable objectives of extending both the thickening and the setting times and concurrently reducing the fluid loss from the slurry to the formation after injection thereinto prior to the final set thereof.

The invention, accordingly, is: an hydraulic cement composition which has extended thickening and setting times and low fluid loss to the formation during setting and a method of cementing the well penetrating a subterranean formation employing the composition.

The composition consists of (1) Portland or aluminous cement, (2) a copolymer of maleic anhydride and an N-vinyl nitrogen-containing ring monomer selected from the class consisting of N-vinyl-2-oxazinidone, N-vinyl-2-oxazolidinone and alkyl ring-substituted derivatives thereof, N-vinyl morpholinone, and N-vinyl pyrrolidone and mixtures of such monomers, (3) a poly(aryl-vinylbenzyl) compound selected from the class consisting of poly(ar-vinylbenzyl) alkyl- and hydroxy alkyl-substituted quaternary ammonium bases and salts and poly(ar-vinylbenzyl) sulfonium alkyl- and hydroxyalkyl-substituted bases and salts wherein each alkyl or hydroxyalkyl substituent contains not more than 4 carbon atoms, the total number of carbon atoms in the alkyl and hydroxy alkyl groups are not greater than 8 and no more than 1 hydroxyalkyl group is present per molecular weight or unit of polymer, and (4) sufficient water to make a pumpable slurry settable to a monolithic solid. For brevity hereinafter the polymer containing maleic anhydride will sometimes be referred to as the maleic anhydride copolymer and the polymerized quaternary ammonium or the sulfonium compounds as the poly(ar-vinylbenzyl) polymer.

The hydraulic cements employed are any one of those set forth in "API Recommended Practice for Testing Oil-Well Cements (API RP 10B)" and "API Specification for Oil-Well Cements (API Std 10A)," both of January 29, 1958, procurable from the American Petroleum Institute, 300 Garrigon Tower Building, Dallas, Texas. These cements consist of Classes A, B, C, N, D, E, and F, each having characteristics peculiar to itself and adaptable for special conditions as described in full in the API publications.

The copolymer of maleic anhydride and an N-vinyl nitrogen-containing ring compound useful in the practice of the invention are well illustrated by the copolymer of maleic anhydride and an alkyl-substituted N-vinyl-2-oxazolidinone wherein a methyl or ethyl group is substituted at the 4 or 5 position thereof. The preparation of such alkyl substituted N-vinyl oxazolidinones is described in U.S. Patent 2,919,279.

One method of preparing a copolymer of maleic anhydride and an alkyl-substituted N-vinyl-2-oxazolidinone is as follows: An N-vinyl cyclic carbamate, e.g., N-vinyl-5-methyl-2-oxazolidinone, as described in the above numbered patent, and maleic anhydride, in substantially equal molar quantities, are placed in an organic reaction medium, e.g., a mixture of aromatic hydrocarbons such as xylene and toluene and/or aliphatic solvents such as 1,2-dichloroethane and methylene chloride, in the presence of a free radical-promoting catalyst, e.g., azobisisobutyronitrile or a peroxide, or while subjected to irradiation energy such as gamma rays or ultraviolet light, and heated between about 35° and 120° C., preferably at the lower temperatures first and then at the higher temperatures within the stated temperature range, until polymerization is substantially completed. The period required for completion of the reaction varies but is usually from about 1 to 4 days. The copolymer prepared in this manner is substantially insoluble in the organic media named and can be separated therefrom by filtration or the like and thereafter washed and dried.

Examples of the poly(aryl vinylbenzyl) ammonium chloride-substituted salts employed in the practice of the invention include such salts of dimethyl(2-hydroxyethyl); trimethyl; 4-picolinium; 4-methylmorpholinium; pyridinium; 4-(3-hydroxypropylpyridinium); 4-(2-hydroxyethylpyridinium); 2-picolinium; 3-picolinium; 4-picolinium; 2,4-lutidinium; triethyl; and tri-n-propyl. Illustrative of the poly(ar-vinylbenzyl) sulfonium compounds useful in the practice of the invention are those of trimethyl, diethyl, and oxathionium. The poly(aryl vinylbenzyl) ammonium chloride-substituted salts or the poly(aryl vinyl-benzyl) sulfonium compounds, as aforestated, are substantially linear and but lightly cross-linked and either disperse or dissolve in a liquid to give a visually continuous and homogeneous liquid composition which hereinafter will be referred to as a solution, as is customary in polymer chemistry whether or not there is either a true solution or a homogeneous substantially stable dispersion of finely divided particles of a colloidal nature. The polymers useful in the practice of this invention swell and dissolve or disperse in aqueous solutions or slurries. A method of preparing the lightly cross-linked, substantially linear polymers of the poly(aryl vinylbenzyl) quaternary ammonium type, useful in the practice of the invention, is described in U.S. Patent 2,780,604 under Part III thereof. Briefly, the method therein described polymerizes a quaternary ammonium salt of a halo methylated vinyl benzenoid hydrocarbon, either alone or with a monovinyl-aromatic compound, e.g., styrene or other ethylenic compound copolymerizable with styrene, butadiene, optionally with a small percent of bifunctional cross-linking agents, e.g., diisopropyl benzyl or halo methylated divinylbenzene. The polymerization may be carried out in mass, emulsion, or solution in the presence of a free radical catalyst such as 2-azo-bis-isobutyronitrile or benzoyl peroxide at an elevated temperature. The polymer produced may be considered to have the general formula

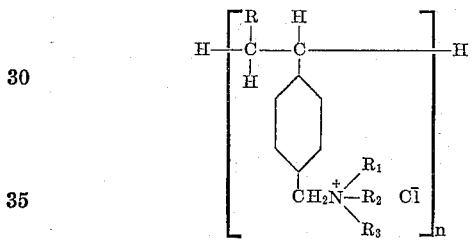

Polymers of the poly(ar-vinylbenzyl) sulfonium type, useful in the practice of the invention, may be briefly described as follows: a poly(ar-vinylbenzyl) chloride latex in an oil-in-water emulsion consists essentially of between about 5 and 40 percent benzyl chloride and up to about 1 percent of a cross-linking monomer, e.g., divinylbenzene, based on the weight of the monomer, between about 0.5 and 10.0 percent of an emulsifier and between 0.1 and 1.0 percent of a peroxy-type initiator, and the balance water. Illustrative of suitable emulsifiers to employ are alkaryl sulfonates and alkaryl polyether sulfonates. Illustrative of suitable initiators are ammonium and alkali metal persulfates. The emulsion thus prepared is purged of air, as by passing nitrogen gas therethrough, and heated at between about 10° and 30° C. for about 16 hours to produce coagulum-free latex.

The poly(ar-vinylbenzyl) chloride latex thus prepared is then copolymerized in an aqueous water-immiscible alcohol or glycol medium with an organic sulfide, such as a dialkyl sulfide, wherein the alkyl group preferably contains between 1 and 4 carbon atoms, e.g., dimethyl sulfide. The sulfide monomers are preferably used in excess of the stoichiometric quantity required to react with the vinylbenzyl ammonium chloride latex. The copolymerization is carried out at between 20° and 70° C., substantially without agitation for a sufficient time to yield a poly[(ar-vinylbenzyl) alkyl sulfonium chloride], a lightly cross-linked homogeneous water-soluble syrupy copolymer having the general formula:

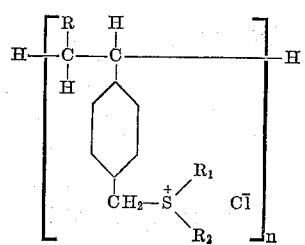

The polymer selected from the class consisting of the poly(ar-vinylbenzyl) alkyl- and hydroxyalkyl-substituted quaternary ammonium bases and salts and poly(ar-vinylbenzyl) sulfonium alkyl and hydroxyalkyl substituted bases and salts will hereinafter be referred to for brevity as the poly(ar-vinylbenzyl) type polymer.

The other polymer prepared by copolymerizing maleic anhydride with an N-vinyl nitrogen-containing ring compound of which N-vinyl-2-oxazolidinone, the methyl or ethyl ring-substituted derivatives thereof, N-vinyl morpholinone, and N-vinyl pyrrolidone, are illustrative will hereinafter be referred to as a maleic anhydride copolymer for brevity.

In the practice of the invention, the total combined weights of the polymers added, based upon the weight of the dry cement, is between 0.2 and 5.0 percent. The preferred total combined weights of the polymers added is between 0.5 and 1.5 percent based on the weight of the dry cement employed. The weight ratio of the poly(arylvinylbenzyl) type polymer to the maleic anhydride copolymer employed in the practice of the invention is between about 32 and 3 of the poly(aryl-vinylbenzyl) type polymer to 1 of the maleic anhydride copolymer. The preferred ratio of the poly(aryl-vinylbenzyl) type polymer to the maleic anhydride copolymer is between about 20 and 5 of the poly(aryl-vinylbenzyl) type polymer to 1 of the maleic anhydride copolymer.

In the practice of the invention, each of the polymers may be added in dry form to the dry cement or the dry polymers may be separately added in dry form to the dry cement prior to making the slurry. On the other hand, the polymers may be added in the dry form either as previously intermixed or individually to the cement-water slurry or each of the polymers may be admixed to a prepared water dispersion individually or they may be both mixed together to form a single dispersion and the dispersion thus made added to the cement-water slurry.

The amount of the combined weights of the two polymers and the ratio of one to the other are controlled by the specific conditions surrounding the cementing operation, e.g., the type of cement being used, the steps, temperature, and pressure of the place where the cement will set, the type of cementing operation being employed, and the length of time intended to be allowed for the setting of the cement slurry after it is positioned in the well. Since the poly(aryl-vinylbenzyl) type polymer is added for the purpose of imparting fluid loss control characteristics to the cement slurry, it is readily understood that the character of the formation will be an important consideration for determining the amount of the poly(aryl-vinylbenzyl) type additament employed. Since the maleic anhydride copolymer employed in the invention has a retarding effect upon both the thickening time and setting time of the cement, the amount thereof to use will be guided by the conditions which effect thickening and setting of the cement. The combined effect of the polymers employed in the invention is to achieve fluid loss control without adversely increasing the viscosity and as a result thereof the pumpability of the cement slurry and, at the same time, achieving an improved setting time.

The effectiveness of the invention is shown hereinafter by comparing aqueous cement slurries which contain the additament of the invention in contrast to those which do not contain it by employing thickening time tests and fluid loss control tests as described in API RP 10B referred to hereinbefore. A 325 mesh screen was used in the filter loss or fluid loss tests. Viscosity was measured on the Fann Viscometer which comprises a stationary bob-rotating sleeve type instrument as described in the 1954 Drilling and Production Practice of the API, pages 7 to 22. The thickening times were run as described in Section VII of API RP 10B on pages 1A and 2A of the data tables therein employing the Pan American Petroleum Corporation Consistometer which is also described in API RP 10B.

Test runs were made, some of which were for the purposes of comparison and others to illustrate the practice of the invention. The runs for comparison are designated by letters and the examples of the invention are designated by numbers.

In the first series of runs, the ratio of the poly(ar-vinylbenzyl) polymer to the maleic anhydride copolymer was varied as well as the total combined weight of the polymers, together, based upon the weight of dry cement used. The fluid loss in 30 minutes in accordance with Section IV of the API RP 10B publication, to which reference was made hereinabove employing a 325 mesh screen, was determined. The viscosity was determined by employing the Fann Viscometer to which reference was made above which was equipped with the stiff spring type bob rotating at 600 r.p.m. The fluid loss was determined at a temperature of 80° F. and a pressure of 100° p.s.i. The cement employed in this series of runs was a Class E cement, known as UNAFLO cement, in an amount of 100 grams per 40 grams of water. The ratio of the polymer additaments, the total thereof added, and the results of the viscosity and fluid loss tests are set out in Table I.

Table I

| Test Run Identification | Total Weight Percent of Polymers Based On Dry Cement Used | Weight Ratio of Poly (Ar-Vinyl-benzyl) Polymer: MA Copolymer | Viscosity in cps. | Fluid Loss in ml. in 30 min. |
| --- | --- | --- | --- | --- |
| a | None |  | 46.2 | >¹ 600 |
| b | 0.5 | 100:0 | 78.1 | 38 |
| 1 | 0.5 | 95:5 | 73.8 | 21 |
| 2 | 0.5 | 90:10 | 65.4 | 22 |
| 3 | 0.5 | 85:15 | 61.2 | 22 |
| c | 1.0 | 100:0 | 135.0 | 8 |
| 4 | 1.0 | 80:20 | 99.1 | 8 |
| 5 | 1.0 | 95:5 | 122.0 | 9 |
| 6 | 1.0 | 90:10 | 101.0 | 7 |
| 7 | 1.0 | 85:15 | 99.2 | 8.5 |
| 8 | 1.0 | 75:25 | (²) | (²) |

¹ In 1 min. Could not be determined directly for a 30 min. period.
² Not determined.

Reference to Comparative Run a in Table I shows that, where no additament was employed in the aqueous cement slurry employing the type E cement (which is commonly employed in deep wells where high pressures and high temperatures are encountered), an excessively high fluid loss resulted. Comparative Runs b and c show that when the poly(aryl-vinylbenzyl) polymer alone was employed in an amount of 0.5 and 1.0 weight percent based on the dry cement content, the fluid loss was increasingly lessened but such improvement was accompanied by an undesirable increase in the viscosity and therefore, an impairment of pumpability and ease of injecting and emplacing the slurry in a well would result. It is clear from a reference to the examples of the invention that when as little as 5 parts of the maleic anhydride copolymer are admixed with 95 parts of the poly(aryl-vinylbenzyl) polymer, the viscosity was appreciably lessened and as the proportion of the maleic anhydride copolymer was increased, the viscosity steadily decreased.

When the ratio of poly(aryl-vinylbenzyl) polymer to that of the maleic anhydride copolymer was increased to 75:25, respectively (Example 8), the aqueous cement slurry containing the additive showed a tendency to separate into two layers, a thin watery stratum and a thicker cement slurry.

A series of test runs were made wherein the thickening times were determined according to the schedules set forth in Table II below in accordance with the procedure set forth in the thickening time test schedules of Section VII of API RP 10B. Thickening is considered to have occurred when a viscosity of 10,000 centipoises is reached. The comparative runs are again designated by letters whereas the examples in accordance with the invention are designated by numbers. The class of cement employed is also set out in Table II and the total percent of the polymers together as well as the ratio by weight of the poly(aryl-vinylbenzyl) polymer to the maleic anhydride copolymer. The same proportion of water to dry cement by weight was employed as in the blank runs and examples of Table I, viz., 40 percent water based upon the weight of dry cement.

*Tablet II*

| Test Run Identification | Total Weight Percent of Polymers Based on Dry Cement | Total Ratio of Poly (Ar-Vinylbenzyl) Polymer: M. A. Copolymer | API Schedule | Class of Cement Used | Thickening Time in Hours and Minutes |
|---|---|---|---|---|---|
| d | None | | 1 5 | A | 1:55 |
| e | 1.0 | 100:0 | 5 | A | 0:35 |
| 9 | 1.0 | 90:10 | 5 | A | 3:11 |
| f | None | | 2 7 | A | 1:00 |
| 10 | 1.0 | 90:10 | 7 | A | 1:25 |
| 11 | 1.0 | 85:15 | 7 | A | 2:45 |
| g | None | | 3 8 | D | 2:00 |
| h | 1.0 | 95:5 | 8 | D | 2:30 |
| 12 | 1.0 | 90:10 | 8 | D | 4:00 |
| i | None | | 8 | E | 3:10 |
| j | 1.0 | 100:0 | 8 | E | 6 2:35 |
| 13 | 1.0 | 95:5 | 8 | E | 7 4:00+ |
| 14 | 1.0 | 90:10 | 8 | E | 4:00+ |
| k | None | | 4 18 | E | 1:40 |
| 15 | 1.0 | 90:10 | 18 | E | 4:00+ |
| l | None | | 5 19 | E | 1:00 |
| 16 | 1.0 | 90:10 | 19 | E | 4:00+ |
| 17 | 1.0 | 85:15 | 19 | E | 4:00+ |

¹ Schedule 5 simulates a depth of 8,000 feet, temperatue of 125° F., and pressure of 5,160 p.s.i.
² Schedule 7 simulates a depth of 12,000 feet, temperature of 172° F., and pressure of 10,230 p.s.i.
³ Schedule 8 simulates a depth of 14,000 feet, temperature of 206° F., and pressure of 13,390 p.s.i.
⁴ Schedule 18 simulates a depth of 14,000 feet, temperature of 213° F., and pressure of 11,800 p.s.i.
⁵ Schedule 19 simulates a depth of 14,000 feet, temperature of 242° F., and pressure of 14,000 p.s.i.
⁶ This slurry comprised a dry cement to water weight ratio of 100:46.
⁷ This test was discontinued after 4 hours although the slurry had not yet thickened.

Reference to Comparative Runs d, f, g, i, k, and l of Table II shows that when no fluid loss additive was present in the aqueous cement slurry (particularly in the Class A cement slurries), that the thickening time was less than desirable, even when employing the retardant cements. Comparative Runs e and j show that when the polymer consisting of only the poly(ar-vinylbenzyl) polymer was added, in an amount of 1.0 percent, to the aqueous cement slurries, the thickening time was then far too short. Examples 10 and 11 of the invention in Table II show that when both the poly(ar-vinylbenzyl) polymer and the maleic anhydride copolymer (as heretofore described) were added to an aqueous Class A cement slurry in a ratio of 90:10 the thickening time was extended and when added in a ratio of 85:10, it was appreciably extended. When both polymers were added to the retarded cement slurries, viz., Classes D and E, the thickening time was extended beyond 4 hours. The examples further show that better results are obtained in the practice of the invention when employing Class A cement by using between 10 and 15 percent of the maleic anhydride copolymer but that only 5 percent thereof produced excellent results with the retarded cements.

A series of test runs was made to ascertain the effect of the presence of the additament of the invention in aqueous cement slurries on the ultimate compressive strength of the set cement resulting from the slurry. The percent of total weight of polymers added and the ratio of the two polymers are shown in Table III. The strength tests were run according to Section V of API RP 10B at a pressure of 3,000 p.s.i. and at the temperature shown in Table III. The results obtained by employing the Tinius Olsen Standard Super L testing machine are also shown in Table III.

*Table III*

| Test Run Identification | Total Weight Percent of Polymers Based on Dry Cement | Weight Ratio of Poly (Ar-Vinylbenzyl) Polymer: M. A. Copolymer | Type Cement | Temp. in °F | Compressive Strength in p.s.i. |
|---|---|---|---|---|---|
| m | None | | A | 170 | 6,795 |
| 18 | 1.0 | 90:10 | A | 170 | 4,966 |
| 19 | 1.0 | 85:15 | A | 170 | 4,397 |
| n | None | | A | 110 | 3,400 |
| 20 | 1.0 | 90:10 | A | 110 | 2,631 |
| 21 | 1.0 | 85:15 | A | 110 | 2,338 |
| o | None | | D | 200 | 2,323 |
| 22 | 1.0 | 85:5 | D | 200 | 1,565 |
| 23 | 1.0 | 90:10 | D | 200 | 977 |
| p | None | | E | 200 | 4,825 |
| 24 | 1.0 | 95:5 | E | 200 | 5,367 |
| 25 | 1.0 | 90:10 | E | 200 | 2,581 |

Reference to the runs set out in Table III shows that the compressive strength values of the set cement formed from cement slurries made conventionally as illustrated by the lettered runs, when contracted to those containing the retardant-fluid loss control additament in accordance with the invention as illustrated by the numbered runs, were of comparable value. In those instances where a retarded cement was employed, e.g., Class D in Examples 22 and 23, had the cement been allowed to stand for a longer time, the cement would have set to a satisfactory compressive strength.

A series of tests was run to show the effect on fluid loss of employing between 0.05 and 1.5 percent of the total weight of the polymers added and of varying the ratio of the poly(aryl-vinylbenzyl) polymer to the maleic anhydride copolymer from between 95:1 to 85:15 with the 0.05 to 1.5 total weight range. All the fluid loss tests in this series of runs were made employing the high pressure-high temperature procedure described in Section IV, paragraph 17–b of API RP 10B. The pressure employed was 500 p.s.i. in all tests run. The temperatures employed in the separate tests and fluid loss values obtained are also set out in Table IV.

*Table IV*

| Test Run Identification | Total Weight Percent of Polymers Based on Dry Cement | Weight Ratio of Poly(Ar-Vinylbenyl) Polymer: M. A. | Type of Cement | Temp. at which Filter Loss Was Obtained | Filter Loss in ml./30 min. |
|---|---|---|---|---|---|
| q | 1.0 | 100:0 | A | 125 | (¹) |
| 26 | 1.0 | 90:10 | A | 125 | 55 |
| 27 | 1.0 | 90:10 | A | 172 | 72.5 |
| 28 | 1.0 | 85:15 | A | 172 | 70 |
| 29 | 0.75 | 90:10 | D | 200 | 47 |
| 30 | 1.0 | 95:5 | D | 200 | 36 |
| 31 | 1.0 | 90:10 | D | 200 | 38 |
| 32 | 1.0 | 85:15 | D | 200 | 31 |
| 33 | 1.5 | 90:10 | D | 200 | 15 |
| 34 | 0.75 | 90:10 | E | 200 | 59 |
| 35 | 1.0 | 95:5 | D | 200 | 34 |
| 36 | 1.0 | 90:10 | E | 200 | 35 |
| 37 | 1.0 | 85:15 | E | 200 | 45 |
| 38 | 1.5 | 90:10 | E | 200 | 16 |

¹ Too thick to be determined.

Reference to Table IV shows the presence of the fluid loss additament, viz., the poly(ar-vinylbenzyl) polymer, alone resulted in an aqueous cement slurry which was too thick. It also shows that a ratio of the poly(aryl-vinylbenzyl) polymer to the maleic anhydride copolymer of between 85:15 to 95:5, respectively, produced excellent results.

What is claimed and desired to be protected by Letters Patent is:

1. An aqueous hydraulic cement slurry for use in cementing a well penetrating a subterranean formation, having increased thickening and setting times and decreased fluid loss when in contact with the formation, comprising water, hydraulic cement, and between 0.2 and 5.0 percent, based on the dry hydraulic cement employed, of (1) a copolymer prepared by copolymerizing maleic anhydride and an N-vinyl nitrogen-containing ring compound selected from the class consisting of N-vinyl morpholinone, N-vinyl-pyrrolidone, N-vinyl-2-oxazinidinone, N-vinyl-2-oxazolidinone and ring-substituted alkyl derivatives thereof wherein the alkyl group consists of the $C_1$ and $C_2$ groups, and (2) a polymer prepared by polymerizing an aryl-vinylbenzyl monomer, selected from the class consisting of poly(ar-vinylbenzyl) alkyl- and hydroxyalkyl-substituted quaternary ammonium bases and salts, and poly(ar-vinylbenzyl) sulfonium alkyl- and hydroxyalkyl-substituted bases and salts wherein said alkyl or hydroxyalkyl substituent contains not more than 4 carbon atoms, the total number of carbon atoms in the alkyl and hydroxyalkyl groups is not greater than 8, and no more than 1 hydroxyalkyl group is present per recurring or repeating unit of the polymer, in a ratio of said copolymer of maleic anhydride and the N-vinyl ring compound to said polymer of the aryl-vinylbenzyl prepared from said aryl-vinylbenzyl monomer of between 32 and 3 of the copolymer of maleic anhydride and N-vinyl ring compound to 1 of the aryl-vinylbenzyl polymer.

2. The aqueous hydraulic cement slurry of claim 1 wherein the ratio of said maleic anhydride and N-vinyl ring compound copolymer to the aryl vinylbenzyl polymer is between 20 and 4 of the maleic anhydride-containing copolymer to 1 of the aryl-vinylbenzyl polymer.

3. The aqueous hydraulic cement slurry of claim 1 wherein the total weight of the polymers present is between 0.5 and 1.5 percent of said polymers based upon the dry weight of the hydraulic cement used.

4. The method of cementing a well comprising injecting down the well, positioning at the level desired the aqueous cement slurry of claim 1, and allowing said slurry to stand substantially undisturbed until it has set to a monolithic solid.

5. The method of cementing a well comprising injecting down the well and positioning at the level desired, the aqueous hydraulic cement slurry of claim 2 and allowing said slurry to stand substantially undisturbed until it has set to a monolithic solid.

6. The method of cementing a well comprising injecting down the well and positioning at the level desired the aqueous hydraulic cement slurry of claim 3, and allowing said slurry to set substantially undisturbed until it has set to a monolithic solid.

No references cited.